US008748832B2

(12) United States Patent
Brambilla et al.

(10) Patent No.: US 8,748,832 B2
(45) Date of Patent: Jun. 10, 2014

(54) IONIZING RADIATION DETECTION DEVICE WITH A SEMI-CONDUCTOR DETECTOR HAVING AND IMPROVED SPECTROMETRIC RESPONSE

(75) Inventors: Andréa Brambilla, Veurey-Voroize (FR); Patrice Ouvrier-Buffet, Saint-Jorioz (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 0 days.

(21) Appl. No.: 13/535,852

(22) Filed: Jun. 28, 2012

(65) Prior Publication Data
US 2013/0168562 A1 Jul. 4, 2013

(30) Foreign Application Priority Data

Jul. 1, 2011 (FR) ...................................... 11 55953

(51) Int. Cl.
*G01T 1/24* (2006.01)
(52) U.S. Cl.
USPC .................................................... 250/370.01
(58) Field of Classification Search
USPC .............................. 250/370.01–370.15, 362, 250/363.01–363.1; 378/98.8
See application file for complete search history.

(56) References Cited

U.S. PATENT DOCUMENTS

| 6,300,635 | B1 | 10/2001 | Brambilla et al. |
| 7,345,285 | B2 | 3/2008 | Montemont et al. |
| 7,388,210 | B2 | 6/2008 | Ouvrier-Buffet et al. |
| 7,436,165 | B2 | 10/2008 | Ouvrier-Buffet et al. |
| 7,652,242 | B2 | 1/2010 | Ouvrier-Buffet et al. |
| 7,825,385 | B2 | 11/2010 | Gasse et al. |
| 8,269,183 | B2 * | 9/2012 | Furumiya et al. .......... 250/370.1 |
| 2007/0005271 | A1 | 1/2007 | Gros D'Aillon et al. |
| 2010/0010779 | A1 | 1/2010 | Rostaing et al. |
| 2011/0098980 | A1 | 4/2011 | Ouvrier-Buffet et al. |
| 2012/0239310 | A1 | 9/2012 | Ouvrier-Buffet et al. |

FOREIGN PATENT DOCUMENTS

| EP | 1739456 A1 | 1/2007 |
| WO | WO 2011-064381 | 6/2011 |
| WO | WO 2011-069748 | 6/2011 |

OTHER PUBLICATIONS

U.S. Appl. No. 13/512,485, filed May 29, 2012, Rinkel, et al.
French Search Report issued Feb. 23, 2012 in Patent Application No. 1155953.
Stephen E. Anderson et al., "Digital Waveform Analysis Techniques for Pixelated Semiconductor Detectors", Nuclear Science Symposium Conference Record, 2007 IEEE, pp. 1581-1586.
Jason Hayward et al., "Observation of charge-sharing in a n HPGe double-sided strip detector" Nuclear Instruments and Methods in Physics Research A 579, 2007, pp. 99-103.

* cited by examiner

*Primary Examiner* — Kiho Kim
(74) *Attorney, Agent, or Firm* — Oblon, Spivak, McClelland, Maier & Neustadt, L.L.P.

(57) ABSTRACT

An ionizing radiation detection device including a detector of semi-conductor material intended to be biased thanks to electrodes, among which reading electrodes connected to a reading circuit process signals they provide to reject those causing a poor spectrometric response, that is those affected by an induction share and possibly those affected by a charge or electronic noise share.

20 Claims, 9 Drawing Sheets

US 8,748,832 B2

IONIZING RADIATION DETECTION DEVICE WITH A SEMI-CONDUCTOR DETECTOR HAVING AND IMPROVED SPECTROMETRIC RESPONSE

TECHNICAL FIELD

The present invention relates to an ionizing radiation detection device with a semi-conductor having an improved spectrometric response. These ionizing radiation detection devices are in particular applicable for non-destructively inspecting materials, searching for dangerous or illicit substances, for example in luggage. The materials or luggage to be inspected are then placed between the detection device and an ionizing radiation source. Another application could be medicine and observation of living organisms. These ionizing radiation detection devices allow to image objects or living organisms to be inspected

STATE OF PRIOR ART

An ionizing radiation detection device with a semi-conductor detector includes a detector 1 for ionizing radiation 5 of semi-conductor material which cooperates with an electronic circuit 2 for reading signals provided by the semi-conductor detector 1. FIG. 1 can be referred to.

The ionizing radiation detector 1 includes a crystal 1.1 of semi-conductor material having generally a parallelepiped shape two generally opposite main faces 1.2, 1.3 of which, carry each one or more electrodes.

In imaging applications, the semi-conductor material crystal has generally a thickness between a few hundred micrometers and a few millimeters, or even a few centimeters and an area of a few square centimeters or even a few tens of square centimeters.

The semi-conductor material can be for example CdZnTe, CdTe, $HgI_2$, GaAs, Si and the ionizing radiations 5 can be alpha, beta, X, gamma rays or even neutrons. Neutrons are not directly ionizing radiations but they induce ionizing radiations by particulates created when they interact with matter.

From the main faces 1.2, 1.3 of the semi-conductor crystal 1.1 equipped with electrodes, a first face 1.2 includes one or several electrodes called cathodes 3.1 to be brought to a first potential and the other face 1.3 includes one or several electrodes called anodes 3.2 to be brought to a second potential higher than the first potential. Generally, the second potential is substantially the ground and the first potential is negative. Consequently, the reading circuit 2 can be connected to the anodes 3.2 avoiding any high voltage problem. In the following, by reading electrodes, it will be meant those connected to the reading circuit.

Electrodes 3.1, 3.2 are also used to bias the detector 1 so as to allow migration of carriers (that is electrons or holes) into the semi-conductor material, the carriers being created in the semi-conductor material under the effect of an interaction between the semi-conductor material and the incident ionizing radiation 5. Indeed, an incident ionizing radiation having a sufficient energy will pull out electrons from the atoms of the semi-conductor material it collides with.

In most usual semi-conductor materials mentioned above, the potential applied to the anode is lower than that applied to the cathode. Electrons are collected by anodes 3.2, that is why the latter are connected to the reading circuit 2.

Cathodes 3.1 have generally a role restricted to biasing the detector 1 and a single cathode is frequently used.

Several anodes 3.2 arranged as an array or a strip, arranged in studs and isolated from each other are generally used.

When a bias voltage is applied between the cathode and anodes, an electric field appears in the semi-conductor material and it will drive holes to the cathodes and electrons to the anodes. Each anode 3.2 cooperates with a volume V of semi-conductor material which is facing it. This volume is represented by the hatched area in FIG. 1. It actually makes up a pixel. Anode 3.2 is considered as associated with the pixel in the following.

During an interaction of the semi-conductor material with an incident ionizing radiation 5 produced by a ionizing radiation source 6, the electron type charges generated in the volume V of semi-conductor material facing an anode 3.2 are collected by this anode. These charges collected by an anode induce an electric current pulse the integral of which is proportional to the energy deposited by the ionizing radiation 5. Part of the reading circuit 2 is used to measure this integral; generally, this is a charge preamplifier 2.10. This charge preamplifier 2.10 is generally connected at the output thereof to a signal shaping circuit 2.11. At the output of the shaping circuit 2.11, therefore there are available pulsed signals the amplitude of which should be proportional to the charge created by the interaction of the ionizing radiation 5 in the volume V of semi-conductor material facing the anode 3.2.

It is of course possible to use the signal appearing on the cathode to measure the transiting total charge without being disturbed by a pixel effect on the anode side. It can also be useful to perform anode-cathode biparametric measurements to find the interaction depth of the incident ionizing radiation 5.

When using such an ionizing radiation detection device for imaging, it is attempted to obtain an image of the object 7 or the living organism which is placed between the ionizing radiation source 6 and the detection device.

In the following, only the object will be referred to, without being restricted thereto. The ionizing radiation 5 which passes through the object 7 is attenuated at the time when it reaches the detector 1. The intensity of the ionizing radiation 5 which reaches the detector 1 depends on the chemical composition and the density of the object 7 therethrough. Reading electrodes 3.2 connected to the reading circuit 2 provide signals the intensity of which depends on the attenuation delivered by the object 7. By processing these signals in the reading circuit 2, a transmission contrast image can be obtained from the object 7, which enables information about the inner structure of the object 7 to be gained.

Dual energy or multi-energy irradiation techniques enable information about the chemical composition and more details about the density of materials making up the object to be acquired.

To perform images of the observed object 7 with an acceptable quality, it is necessary for the detector 1 to have as good as possible spectrometric response, which necessitates a great number of pixels available and thus a great number of reading electrodes 3.2. Then, each of them should be connected to a unit reading circuit. And yet, it appears that reading electrodes collect interfering signals that should be rejected if the desired quality is to be achieved.

The reading circuit 2 should then be capable of getting rid of these interfering signals.

These interfering signals are due to three main causes, that is electronic noise, induction share and charge share.

Electronic noise is due to random fluctuations in the signal in the absence of exposure to ionizing radiations.

Induction share occurs when an ionizing radiation is absorbed in the vicinity of a pixel and charges generated by this radiation are not collected by this pixel. In such a case, they induce on the electrode associated with this pixel a current pulse immediately followed by another current pulse of the opposite sign.

Charge share occurs when an ionizing radiation is absorbed in a pixel or between two neighbouring pixels and the charges are collected by the two electrodes associated with these two neighbouring pixels.

FIG. 1 schematically represents the reading circuit 2. It is comprised, for each reading electrode 3.2, of a charge preamplifier 2.10 followed by a shaping circuit 2.11. Several shaping circuits 2.11 can be used, they can be derivating and integrating filters, Gaussian filters, trapezoidal or triangular filters. Most often, these filters are tunable and their time constant can be set. Generally, these filters are means enabling to perform an analogue pulse the amplitude of which is proportional to the charge collected by the reading electrode.

These filters can be followed by several comparator/counter circuits (not represented), each comparator compares the signal provided by the filter with a determined threshold and the counter is implemented if the threshold is exceeded. This allows a coarse classification of the absorbed ionizing radiation in some energy channels. This type of circuit does not provide for processing interfering signals.

There are other ionizing radiation detection devices the reading circuits of which further include an analogue converter in each pixel as the Timepix circuit developed by the Medipix collaboration or a digital-to-analogue converter and a time-digital converter circuit as the ERPC circuit from AJAT Company. Both reading circuits measure the amplitude of pulses for each photon that interacted in the detector. They enable the energy spectrum of interactions which occur in each pixel of the detector to be obtained. They also are capable of summing the amplitude of pulses simultaneously detected in two neighbouring pixels to correct effects of the charge share. On the other hand, they cannot distinguish pulses due to induction share and process them as useful pulses as soon as their amplitude exceeds the detection threshold.

DESCRIPTION OF THE INVENTION

One purpose of the present invention is actually to provide an ionizing radiation detection device which corrects the effects of induction share and possibly charge share. The obtained device enables a better spectrometric response to be obtained, that is a more reliable estimation, than in prior art, of the energy of interactions, by removing noise generated by induction share and possibly charge share.

The reduction of these noise sources also results in a better sensitivity.

Finally, the correction of charge share can generate a better spatial resolution.

To that end, the present invention provides an ionizing radiation detection device including a detector of semi-conductor material intended to be biased thanks to electrodes, among which reading electrodes connected to a reading circuit which digitizes signals they provide, these signals being processed to reject those causing a poor spectrometric response.

More precisely, the present invention is an ionizing radiation detection device comprising a detector of semi-conductor material intended to be biased thanks to electrodes, among which reading electrodes capable of collecting charges created in the detector during an interaction between the ionizing radiation and the semi-conductor material of the detector and which are connected to a reading circuit including:

first processing means capable of providing a pulse when a charge has been collected by one of the reading electrodes, the pulse being formed with respect to a baseline, second means for processing the pulse provided by the first processing means including:

means for determining a parameter comprising a time parameter of the pulse or an amplitude value of the pulse after a baseline crossing between the start and the end of the pulse, means for rejecting the pulse depending on the value of said parameter and for preserving the pulse if it is not rejected, means for operating the pulse preserved by the rejecting means. Thus, the second processing means correct an induction share.

It is reminded that the baseline corresponds to the signal level when there is no pulse.

The first processing means can include analogue processing means including a charge preamplifier possibly connected to a shaping circuit, these analogue processing means being capable of providing an analogue pulse the amplitude of which is proportional to the charge collected by one of the reading electrodes.

Alternatively, the first processing means can include digital processing means capable of providing a digitized pulse when a charge has been collected by one of the reading electrodes, this digitized pulse being formed by a succession of discrete signals, these digital processing means being downstream of the analogue processing means insofar as the analogue processing means are present.

The digital processing means can include a digitizer and possibly downstream of it, digital shaping means.

It is possible that the second processing means are digital. They can further include means for determining a time deviation between two digitized pulses provided by the first processing means and coming from two neighbouring electrodes, and means for rejecting one of the digitized pulses and for preserving the other digitized pulse depending on its time deviation. Thus, the second processing means correct a charge share.

The time deviation can be the deviation between the maximum of one of the pulses and the maximum of the other of the pulses, this deviation having to be included in a predetermined acceptance window for the rejecting means to reject one of the digitized pulses and to preserve the other.

The rejecting means can reject the digitized pulse the maximum amplitude of which is the smallest and preserve the digitized pulse the maximum amplitude of which is the greatest.

The second processing means can further include means for correcting the digitized pulse preserved together with the rejected digitized pulse.

The means for correcting the preserved digitized pulse can add to the maximum amplitude of the preserved digitized pulse the maximum amplitude of the rejected digitized pulse.

The second processing means or first processing means can further include amplitude discriminating means capable of rejecting any pulse that said processing means have to process having a maximum amplitude lower than a predetermined threshold. Thus, the electronic noise is removed.

The parameter determined by the second processing means can be a time parameter selected from the rise time of the pulse, the time elapsed between the start of the pulse and the first zero crossing of the pulse.

By amplitude value of the pulse after a baseline crossing (for example a zero crossing) between the start and the end of the pulse, it is meant:

when the pulse is analogue, a value that a pulse can assume after a baseline crossing between the start and the end of the analogue pulse;

when the pulse is digitized, a value assumed by one of the discrete signals that make it up, after a passage by the baseline between the start and the end of the digitized pulse.

This amplitude value of the pulse after a baseline crossing between the start and the end of the digitized pulse can be the minimum Min(i) of the pulse.

When the second processing means are analogue, said time parameter can correspond to the time during which the analogue pulse has a positive amplitude.

The present invention also relates to an ionizing radiation detection method by a detector of semi-conductor material intended to be biased thanks to electrodes, among which reading electrodes capable of collecting charges created in the detector during an interaction between the ionizing radiation and the semi-conductor material of the detector and which are connected to a reading circuit, wherein the method includes the steps of:

providing, after processing by first processing means, a pulse when a charge has been collected by one of the reading electrodes, the pulse being formed with respect to a baseline;

processing by second processing means of the pulse provided by the first processing means, this processing consisting in:

determining by determining means a parameter comprising a time parameter of the pulse or an amplitude value of the pulse after baseline crossing between the start and the end of the pulse, rejecting, by rejecting means, the pulse depending on the value of said parameter and preserving the pulse if it is not rejected, operating the pulse preserved by the rejecting means.

A correction of induction share is thus achieved.

The providing step by the first processing means can provide an analogue or digitized pulse.

The processing by the second processing means can consist in determining a time deviation between two digitized pulses provided by the first processing means and coming from two neighbouring electrodes, rejecting one of the digitized pulses and preserving the other digitized pulse depending on this time deviation. A correction of charge share is thus achieved.

Further, the processing by the second processing means can consist in correcting the preserved digitized pulse together with the rejected digitized pulse.

The method can additionally include an amplitude discriminating step for rejecting any pulse to be processed by the first processing means or the second processing means having a maximum amplitude lower than a predetermined threshold. A removal of electronic noise is thus achieved.

BRIEF DESCRIPTION OF THE DRAWINGS

The present invention will be better understood upon reading the description of exemplary embodiments given by way of illustrating purposes only and in no way limiting, in reference to the appended drawings wherein.

Identical, similar or equivalent parts from different figures described hereinafter have the same reference numerals so as to facilitate switching from one figure to another.

DETAILED DESCRIPTION OF PARTICULAR EMBODIMENTS

To be able to improve the spectrometric response of the ionizing radiation detection device object of the invention, the inventors have determined three types of interfering signals which degrade the performances of the ionizing radiation detection device.

Of course, there is conventionally the electronic noise the amplitude and frequency of which randomly vary, and which are unavoidably found in all the electronic circuits. Such an electronic noise is processed by amplitude thresholding, according to well-known thresholding devices. Such a thresholding step is optional.

Figure 1:
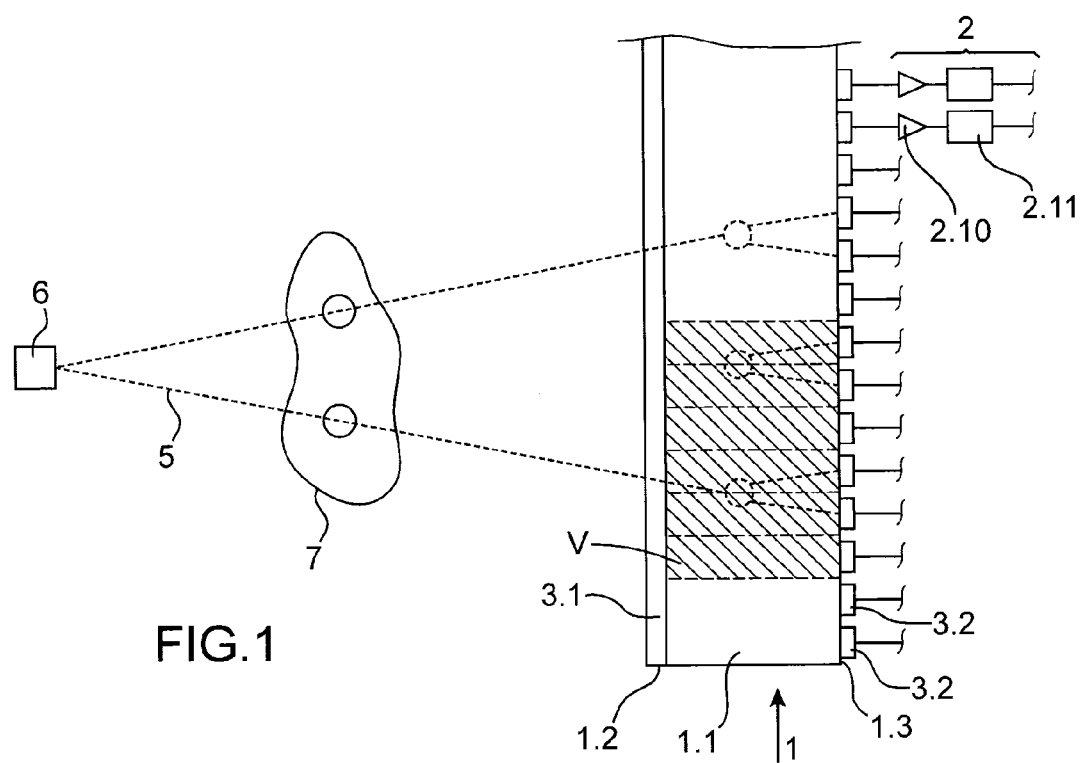
FIG. 1 illustrates the ionizing radiation detection principle using an ionizing radiation detection device according to prior art.

There are also induced charges. FIG. 1 is again referred to. Induced charges appear at a reading electrode 3.1, 3.2 due to the migration of carriers created by interaction between the ionizing radiation 5 and the semi-conductor material of detector 1. Pulses obtained due to induction share are not caused by charges collected as a result of the interaction of the ionizing radiation 5 with the semi-conductor material detector but by the migration, movement of carriers in the semi-conductor material biased following the interaction.

Figure 2A:
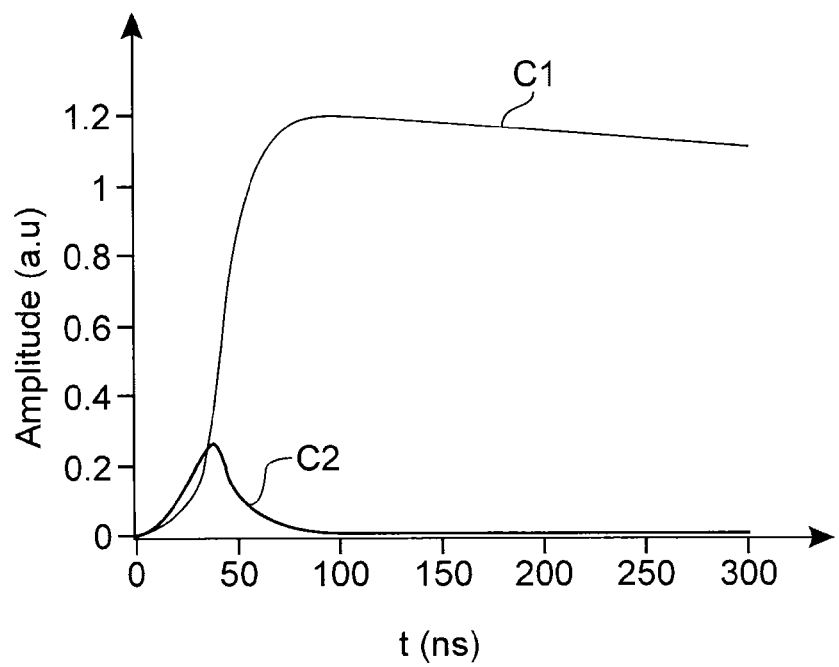
FIG. 2A illustrates the appearance of the signal at the output of the charge preamplifier and FIG. 2B the appearance of the signal at the output of the shaping circuit, these signals coming from two neighbouring reading electrodes.

In FIG. 2A, the curve C1 represents, as a function of time, the amplitude of a pulse provided by a charge preamplifier connected to a first reading electrode, due to the collection of charges generated by an interaction in the semi-conductor material. This pulse is at first of a high amplitude, it has a quite quick rise time and then it slowly decreases.

The curve C2 represents, still as a function of time, the amplitude of a pulse provided by a charge preamplifier connected to a reading electrode neighbouring to the first reading electrode. The pulse is generated by induction shares, the latter being generated by the migration of carriers in the vicinity of this electrode. The pulse has a much lower amplitude, it has quick rise time and fall time.

Figure 2B:
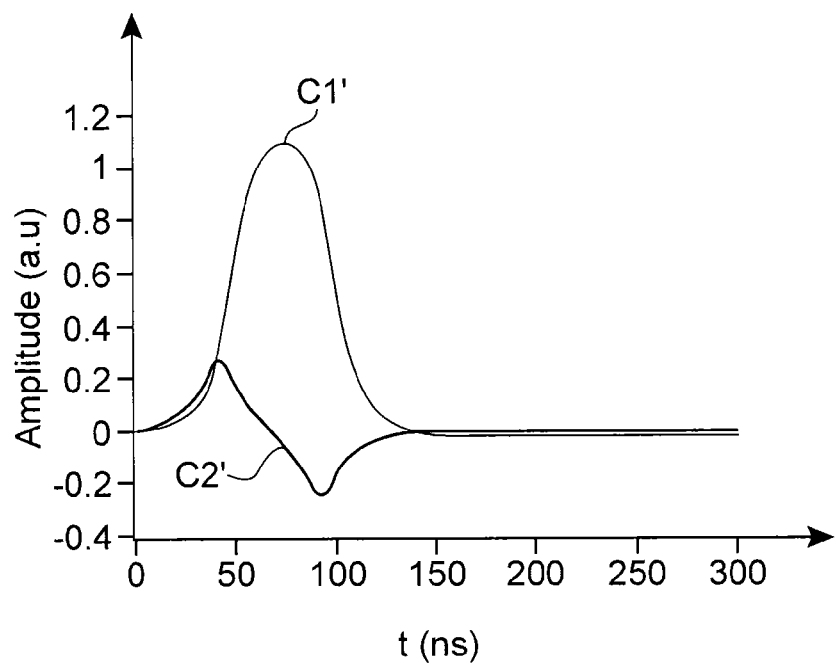

In FIG. 2B is represented a pulse provided by the filtering means of the reading circuit which, in the example shown, are a delay line filter. The curve C1' corresponds to the curve C1 after filtering. It assumes the shape of a substantially symmetrical one-pole pulse and the duration of which is substantially equal to twice the delay brought about by the delay line. This delay is about 50 ns in the described example. The amplitude of the one pole pulse is proportional to the charge released into the semi-conductor material of the detector through the interaction. The curve C2' corresponds to the curve C2 after filtering by filtering means 2.11. This is a pulse having a positive component (also called positive lobe) briefer than pulse C1', followed by a negative component (also called negative lobe) having substantially the same duration as the positive component and the amplitude of which is generally higher than or equal to that of the positive component.

Finally, there is a charge share which occurs when charges generated by the interaction of an ionizing radiation in the detector are collected by several adjacent electrodes.

When an interaction occurs close to the boundary between a volume of semi-conductor material associated with a first reading electrode and a volume of semi-conductor material associated with a reading electrode neighbouring the first electrode, the carriers are shared between the first electrode and its neighbour. When the reading electrodes are small and very close to each other, for example at a 0.8 mm pitch, charges collected on neighbouring electrodes can have been generated by a same interaction. Further, during a first interaction, a secondary ionizing radiation can be emitted and produce a secondary interaction in a volume of semi-conductor material neighbouring that in which the first interaction occurs.

The sum of the signals provided by the neighbouring reading electrodes of a first reading electrode corresponds in principle to the charge generated during an interaction in the volume of semi-conductor material associated with this first reading electrode.

Figure 3A:
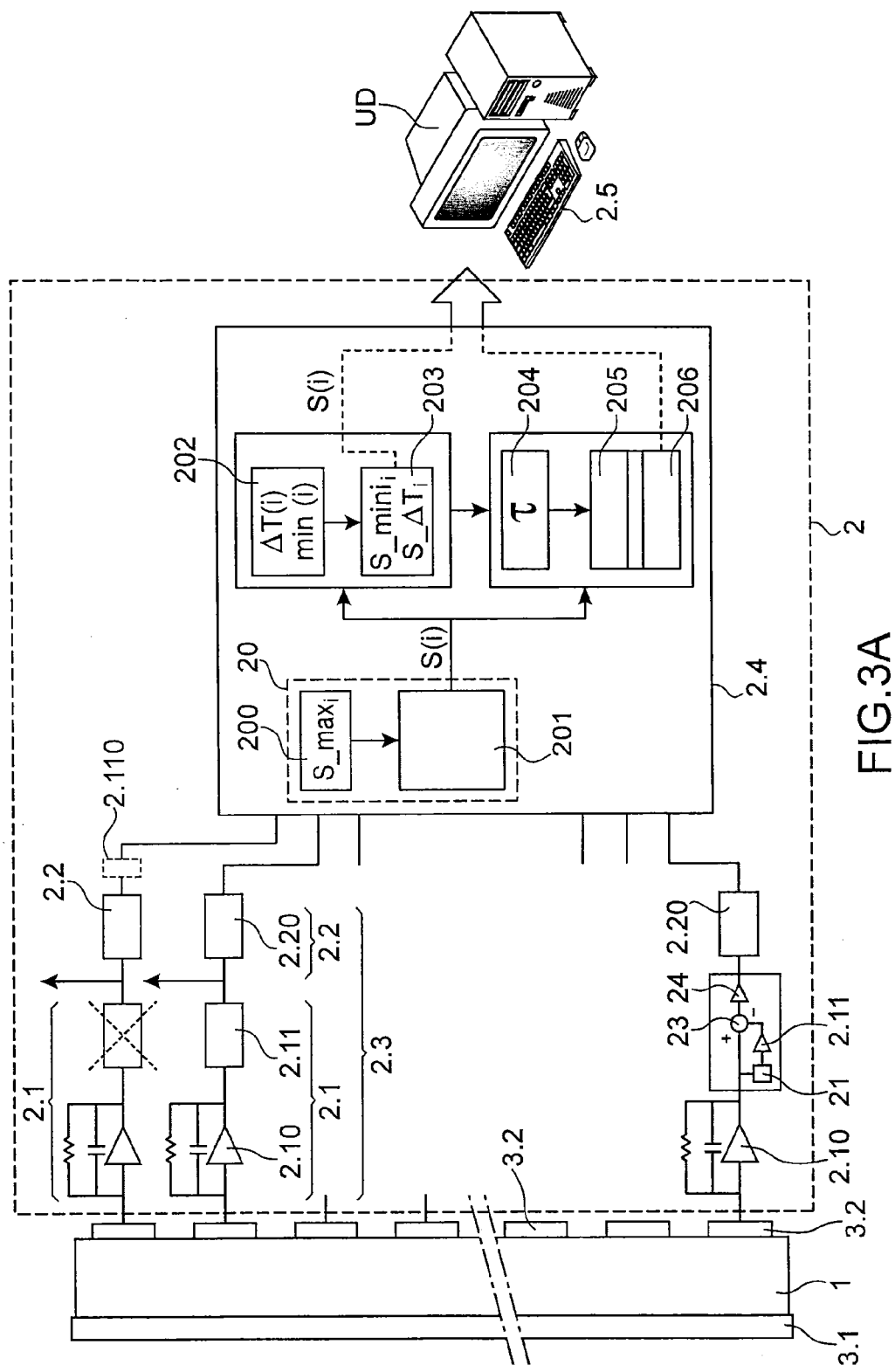
FIG. 3A shows a first example of the ionizing radiation detection device object of the present invention and FIG. 3B shows another example of the ionizing radiation detection device object of the invention.

An ionizing radiation detection device in accordance with the invention will now be described. FIG. 3A is referred to. The semi-conductor detector 1 provided with its electrodes 3.1, 3.2 on two main faces, preferably opposite ones, is substantially identical to that of FIG. 1. It is assumed that reading electrode 3.2 are anodes.

The detection device, object of the invention, also includes a reading circuit 2 connected to each reading electrode 3.2. This reading circuit 2 includes first processing means 2.3, connected to each reading electrode 3.2, which are capable of providing a pulse when a charge has been collected by one of the reading electrodes 3.2. These first processing means 2.3 include in the example of FIG. 3A analogue processing means 2.1 including a charge preamplifier 2.10 connected to each reading electrode 3.2 and an analogue shaping circuit 2.11 connected at the output of each charge preamplifier 2.10. A charge preamplifier 2.10 is a means well known to those skilled in the art and it is not described more in detail. The analogue shaping circuit 2.11 can be a delay line filter or the like. In FIG. 3A, the analogue processing means 2.1 are represented in more detail. The shaping circuit 2.11 is, in this example, a delay line filter. It includes in a first branch, a delay line 21 connected to the charge preamplifier 2.10 on a first side, and to the unity gain amplifier 22 on the other side. The output of the unity gain amplifier 22 is connected to a negative input of a substractor 23, this substractor 23 having a positive input connected to the output of the charge preamplifier 2.10. Thus, it is substracted from a signal provided by the charge preamplifier 2.10, the same signal but being delayed by the delay line 21. The output of the substractor 23 supplies an amplifier 24 with a gain higher than one. The output of the amplifier 24 with a gain higher than one provides an analogue pulse the amplitude of which is proportional to the charge collected by the reading electrode to which the first processing means 2.3 are connected. This collected charge is generally proportional to the energy released by the ionizing radiation that interacted with the volume of semi-conductor material.

Preferably, when a charge is collected by the reading electrode, the shaping circuit 2.11 enables the one-pole and generally symmetrical pulse to be obtained. This pulse can for example be in the form of a Gaussian pulse.

Alternatively, the analogue processing means 2.1 could only include the charge preamplifier 2.10 and not the shaping circuit 2.11.

Figure 4A:
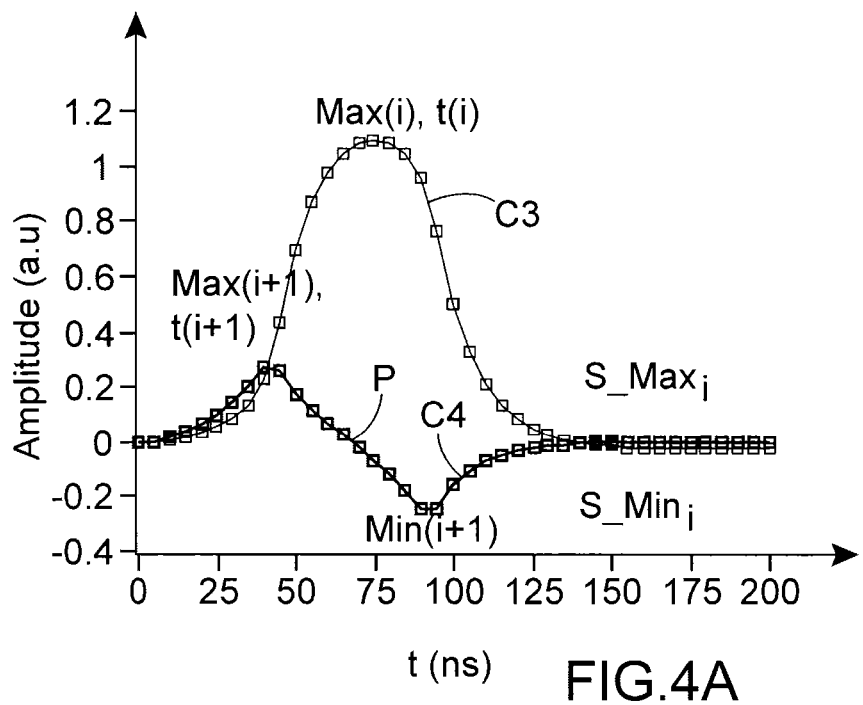
FIG. 4A illustrates a digitized pulse coming from a reading electrode i and a digitized pulse coming from a neighbouring reading electrode i+1 and FIG. 4B shows the digital derivative of the preceding digitized pulses.

In the example of FIG. 3A, the first processing means 2.3 further include, downstream of the analogue processing means 2.1, digital processing means 2.2 comprising a digitizer 2.20 of the analogue pulse provided by the analogue processing means 2.1. This digitizer 2.20 is formed by as many analogue-digital converters as shaping circuits 2.11. Each analogue-digital converter is connected at the output of a shaping circuit 2.11. This digitizer 2.20 converts the analogue pulse provided by the analogue processing means 2.1, in the example by the shaping circuit 2.11 into a digitized pulse. A digitized pulse is formed by a plurality of successive discrete digital signals, represented by points in FIGS. 4A, 4B as will be seen subsequently. In FIG. 4A is represented a digitized pulse coming from a reading electrode i and a neighbouring reading electrode i+1, during an interaction of the ionizing radiation in a volume of semi-conductor material associated with the reading electrode i. References i and i+1 correspond to the row of the reading electrode on a line of successive reading electrodes.

In this example, and in no limiting way, the digitized pulse coming from the reading electrode i is positive, which means that the analogue processing means 2.1 also provide a positive analogue pulse. But the invention is also naturally applicable to the case where the pulse corresponding to a measured charge is negative.

The reading circuit 2 further includes second means 2.4 for processing pulses provided by the first processing means 2.3, which are intended to reject any pulse which would reflect an induction share.

In the example of FIG. 3A, the second processing means 2.4 are digital, they are located downstream of the digital processing means 2.2

The second processing means 2.4 can be formed by a microprocessor, for example, a programmable logic circuit such as a FPGA (field-programmable gate array). The outputs of all the analogue-digital converters 2.20 are connected at the input of the microprocessor 2.4. The second processing means 2.4 have the output thereof connected to means 2.5 for operating digitized pulse which have not been rejected by the second processing means 2.4, these digitized pulses are called "preserved" ones. Such operating means 2.5 include for example a microprocessor, for example that of a user device UD, such as a personal computer. These operating means 2.5 can include a spectrometry line enabling an energy spectrum of non-rejected (or preserved) digitized pulses to be obtained. They can also be made by an imager each pixel of which represents the number of digitized preserved pulses in one or several energy bands, these digitized pulses being generated by a determined anode.

The second processing means 2.4 will carry out processing on pulses coming from first processing means 2.3, so as to reject pulses which would not be useful signals, but interfering signals created by induction share and possibly charge share and/or electronic noise.

By rejecting these interfering pulses, the spectrometric response of the ionizing radiation detection device is improved.

In accordance with an alternative not represented in order not to needlessly multiply the number of figures, if the analogue processing means 2.1 do not include a shaping circuit, the digital processing means 2.20 can comprise downstream of the digitizer 2.20, a shaping circuit 2.110 which then would be digital. It is shown in dotted lines in one of the paths of FIG. 3A and the analogue shaping circuit is represented crossed.

Thus, the shaping circuit 2.110 would process a digitized pulse, that is made up of discrete digital signals. The shaping circuit 2.110 can comprise a delay line, an amplifier as well as a substractor which are arranged as described above for the analogue shaping means 2.11. Its operation is similar to that previously described, except that the processed pulses are digital and no longer analogue. In this alternative, analogue processing means 2.1 would only comprise the charge preamplifier 2.10.

Generally, the reading circuit 2 includes, in the example described in FIG. 3A, downstream of the electrodes 3.2, first processing means 2.3 for providing a pulse when a charge has been collected by one of the reading electrodes, these first processing means 2.3 including analogue processing means 2.1 for delivering an analogue pulse when the charge has been collected, this analogue pulse having an amplitude proportional to the charge collected by the reading electrode and following means 2.2 for digitally processing said analogue pulse, including a digitizer 2.20 which delivers a digitized pulse;

second means 2.4 for processing the pulse delivered by the first processing means 2.3 to reject if it is suspected to correspond to an induction share and possibly a charge share or electronic noise.

FIG. 4A represents, as a function of time, with reference C3, a digitized pulse coming from a first reading electrode i. This digitized pulse is formed by a succession, in time, of discrete digital signals. This digitized pulse has the greatest amplitude. This maximum amplitude corresponds to the maximum value of the discrete digital signals making it up.

Further, this digitized pulse is a one-pole pulse, it does not cross the baseline which corresponds here to the zero value.

It is also represented, with reference C4, a digitized pulse from a second reading electrode neighbouring the first electrode i+1. As discussed above, the reading electrode can be arranged as a strip or an array.

When it is a strip, the electrodes neighbouring an electrode i, will be the reading electrode i−1 which precedes it and the electrode i+1 which follows it.

When it is an array, an electrode i is located between an electrode i−1 and electrode i+1 of the same line. It neighbours successive electrodes h−1, h and h+1 which are in the line preceding the line wherein the electrode i is located. It also neighbours successive electrodes j−1, j and j+1 which are in the line which follows the line wherein the electrode i is located. Electrodes h−1, i−1, j−1 are in a same column, electrodes h, i, j are in a same column, electrodes h+1, i+1, j+1 are in a same column.

In the example described in FIG. 3A, the second processing means 2.4 are digital and are capable of rejecting a digitized pulse which corresponds to electronic noise.

To reject the digitized pulses which correspond to the electronic noise, the second digital processing means 2.4 include means 20 for discriminating in amplitude discrete digital signals of a digitized pulse delivered by the first processing means 2.3. These discriminating means 20 include means 200 for determining an electronic noise discriminating threshold $S\_max_i$ for the discrete digital signals of a digitized pulse. They also include means 201 for rejecting any digitized pulse of which no discrete digital signal would exceed the electronic noise discriminating threshold $S\_max_i$ and for preserving in the opposite case.

In FIG. 4A is represented the electronic noise discriminating threshold $S\_max_i$ and it can be seen that the digitized pulse C3 exceeds the electronic noise discriminating threshold $S\_max_i$ at least locally. The digitized pulse C3 will be preserved.

By removing any digitized pulse the discrete digital signals of which do not exceed the electronic noise discriminating threshold $S\_max_i$, the electronic noise is removed from the useful signal which will be provided by the second digital processing means 2.4 to the operating means 2.5.

The electronic noise discriminating threshold $S\_max_i$ can be different from one reading electrode to the other in order to take gain and noise dispersions related to the detector and the electronics which follows the detector into account.

In accordance with the alternative, the amplitude discriminating means 20 can belong to the first processing means 2.3 and be located upstream of the digital processing means 2.20 if the first processing means 2.3 include digital processing means 2.20 or quite simply downstream of the analogue processing means 2.1. Said analogue discriminating means 20 have been shown in FIG. 3B.

These discriminating means are then analogue and applied to analogue pulses delivered by the analogue shaping circuit 2.11 or by the charge preamplifier 2.10.

Figure 5:
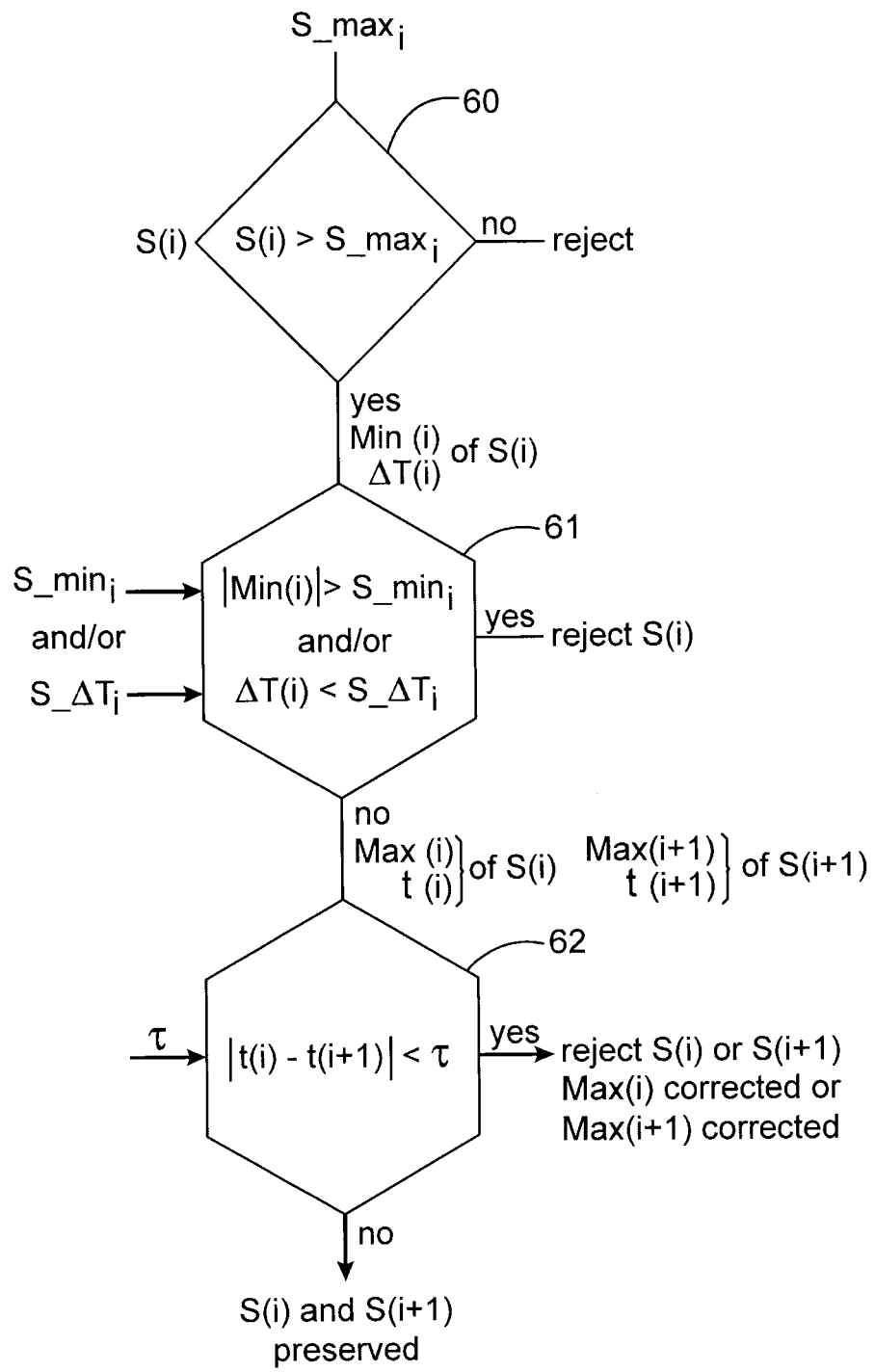
FIG. 5 is a diagram of an algorithm implemented in the second processing means illustrated in FIG. 3A.

FIG. 5 shows as a diagram a digitized pulse processing algorithm S(i) implemented by the reading circuit and more particularly by the second processing means 2.4 which, in the example, are digital. The first block referenced 60 corresponds to an electronic noise removal step.

Still referring to FIG. 3A, to reject digitized pulses which are considered as corresponding to an induction share, the second processing means 2.4 include means 202 for determining one or more characteristic parameters of each digitized pulse S(i) being present downstream of the amplitude discriminating means 20.

If, of course, the amplitude discriminating means 20 are included in the first processing means 2.3, the means 202 for determining one or several characteristic parameters of each digitized pulse directly receive the digitized pulses from the first processing means 2.3.

These characteristic parameters reflect an induction share.

These characteristic parameters can be time parameters or a value reflecting an amplitude of the pulse digitized after a baseline crossing between the start and the end of the digitized pulse preserved.

The time characteristic parameter can for example be the rise time $\Delta T(i)$ of the preserved digitized pulse S(i).

Alternatively, the time parameter can be the time elapsed between the start of the digitized pulse and a first baseline crossing of the digitized pulse.

The value reflecting an amplitude of the digitized pulse after a baseline crossing between the start and the end of the preserved digitized pulse can be the minimum Min(i) of the preserved digitized pulse S(i), as will be explained later on.

The time parameter can be equal to the time variation between two discrete digital signals making up the digitized pulse, one of them being a discrete digital signal after the baseline crossing between the start and the end of the digitized pulse and the other discrete digital signal being for example the discrete digital signal illustrating the start of the digital pulse.

The processing algorithm illustrated in FIG. 5, which is only an example, only takes the minimum and rise time into account.

The minimum Min(i) corresponds to the minimum discrete digital signal of the digitized pulse S(i) from the reading electrode i. More precisely, this minimum Min(i) corresponds to the discrete digital signal having a maximum amplitude after the baseline crossing (that is herein after the zero crossing) of discrete digital signals making up the digitized pulse. Indeed, as already previously mentioned, in an induction share situation, the analogue pulse describes a first lobe, which is positive in the example studied, and then a second lobe, which is negative in the example studied, after a zero crossing. Hence, the discrete digital signals making up digitized pulse S(i) coming from the analogue pulse also describe a first positive lobe, and then a second negative lobe after a zero crossing at the point P as illustrated in FIG. 4A. The minimum discrete digital signal is the discrete digital signal having the highest amplitude in the negative lobe. In other words and generally speaking, the minimum Min(i) corresponds to the discrete digital signal having a maximum amplitude after a zero crossing of the digitized pulse, this definition is applicable both when the first lobe of the digitized pulse is positive and when it is negative.

When this minimum signal Min(i) reaches some predetermined threshold, the pulse will be rejected.

The rise time $\Delta T(i)$ corresponds, in principle, to the time interval separating the first discrete digital signal from the digitized pulse S(i) and the discrete digital signal having a maximum amplitude of the digitized pulse S(i).

The inventors have realised that the way of determining the rise time $\Delta T(i)$ has some importance in the processing efficiency. Ideally, the rise time $\Delta T(i)$ should depend as less as possible on the maximum amplitude of the digitized pulse S(i). An efficient way to obtain a rise time $\Delta T(i)$ which does not take into account a maximum amplitude is to calculate a variation coefficient, or digital derivative, of the preserved digitized pulse S(i) coming from the electrode i, such a variation coefficient being positive.

The variation coefficient K[t] is given by the following expression:

$$K[t]=S[t-n]-S[t]/(T[t-n]-T[t])$$

with T[t] the time associated with the discrete digital signal S[t] of the digitized pulse S(i) corresponding to the reading electrode i;

n being a non-zero natural number, in general n=1.

In the following description, the term "derivative" means "digital derivative" previously defined.

Figure 4B:
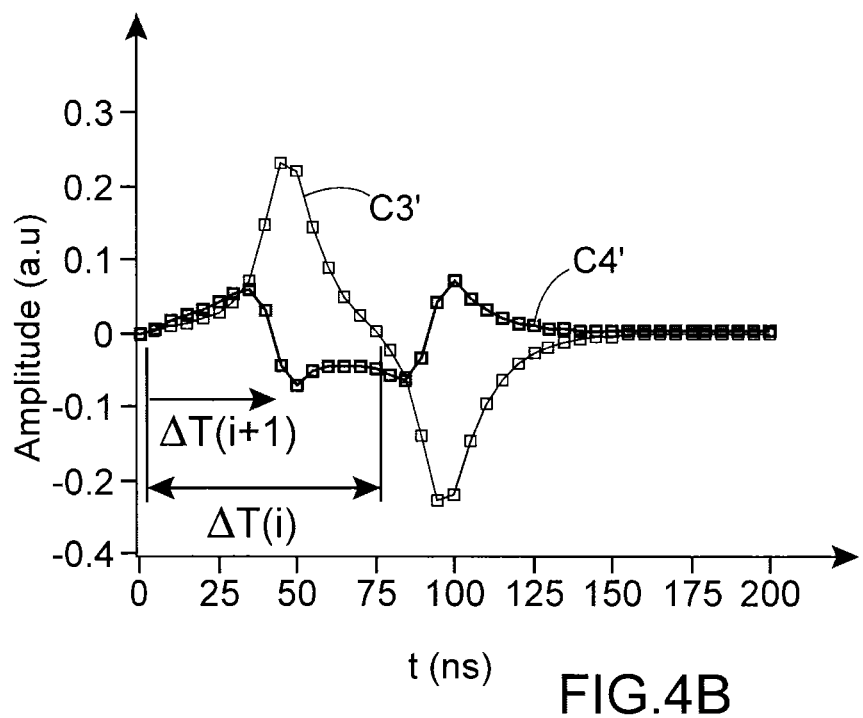

The second digital processing means 2.4 are capable of derivating the digitized pulse S(i). FIG. 4B represents the derivative of the digitized pulse of FIG. 4A, for the reading electrode i (curve C3') and for a neighbouring electrode, herein electrode i+1 (curve C4').

The second digital processing means 2.4 also include means 203 for rejecting any preserved digitized pulse which does not fulfil at least one induction share criterion, relating to one of the parameters previously determined. The digitized pulse that fulfils this induction share criterion would be preserved. These rejecting means 203 cooperate with the means 202 for determining one or more characteristic parameters reflecting an induction share.

An induction share criterion relating to the minimum Min (i) could be:

$$|Min(i)|>S\_min_i \qquad (1)$$

with $S\_min_i$ being a predetermined minimal amplitude threshold.

In other words, it is considered that a digitized pulse S(i) is due to an induction share, and thus that this should not be taken into account, when the minimum discrete digital signal, or more generally, when a discrete digital signal, of the digitized pulse S(i) exceeds a certain threshold $S\_min_i$ after the baseline crossing of this pulse, the baseline being here represented by the zero value.

By performing a thresholding of the digitized pulse S(i), the threshold $S\_min_i$ being set below the baseline, pulses crossing this threshold $S\_min_i$ can be discriminated. These pulses having crossed the threshold $S\_min_i$ are considered as pulses due to an induction share and are therefore rejected. Thresholding can be performed by identifying the maximum amplitude below the baseline, previously defined by the term Min(i) and by comparing this maximum amplitude with the threshold $S\_min_i$. It can also be performed by rejecting a digitized pulse as soon as one of the signals crosses this threshold.

Digitized pulses which have a significant negative rebound are thus removed, this significant negative rebound being always present in the case of induction share as illustrated in FIG. 4A for the digitized pulse C4 coming from the reading electrode i+1. The digitized pulse C3 coming from the electrode i would be preserved because it fulfils the induction share criterion relating to the minimum whereas the digitized pulse coming from the reading electrode i+1 would be rejected.

In principle, the absolute value of the rebound amplitude is higher than the amplitude of the positive part of the digitized pulse. The value of the threshold $S\_min_i$ can be empirically or experimentally determined. The characteristic threshold of the electronic noise and the minimum amplitude threshold predetermined can thus be made equal:

$$S\_min_i=|S\_max_i|.$$

An induction share criterion relating to the rise time $\Delta T(i)$ could be:

$$\Delta T(i)<S\_\Delta T_i \qquad (2)$$

$S\_\Delta T_i$ is a predetermined rise time threshold. Indeed, as can be seen in FIG. 4B, the rise time of the digitized pulse corresponding to an induction share is higher than the rise time of a digitized pulse corresponding to a collected charge.

The induction share criterion relating to the rise time enables digitized pulses, which have too small a rise time to correspond to the useful digitized pulse, to be removed. In the example described, the digitized pulse coming from the reading electrode i would be preserved because it fulfils the induction share criterion relating to the rise time, the digitized pulse coming from the reading electrode i+1 would be rejected.

The induction share criterion could be relating to the time variation, that is the slope, between two discrete digital signals making up the digitized pulse, for example between the start of the pulse and its maximum. The criterion is such that the slope is compared to a certain predetermined threshold, and depending on the comparison result, the digitized pulse can be considered or not as being generated by an induction share.

The induction share criterion relating to the duration between two discrete digital signals of the digitized pulse is such that this duration is lower than a certain threshold, this reflects that the digitized pulse can be considered as being generated by an induction share. On the contrary, when the digitized pulse corresponds to a collected charge, this duration slowly tends to zero.

The second digital processing means 2.4 can apply only one of the criteria or combine several of them. In FIG. 5, the second block 61 corresponds to one or several induction share removal steps.

The second digital processing means 2.4 can also include means 204 for determining digitized pulses S(i), S(i+1) coming from two neighbouring reading electrodes likely to reveal a charge share.

These digitized pulses are preserved, this means that they are preserved at the end of the electronic noise removal step (block 60) and possibly at the end of the induction share removal step (block 61).

It is assumed that in the example described, only two preserved digitized pulses S(i), S(i+1) coming respectively from the reading electrode i and the reading electrode i+1 have been preserved. These two preserved digitized pulses are likely to reveal a charge share if the time instant of their maximum is within a predetermined time acceptance window τ. For each preserved digitized pulse S(i), S(i+1), the time instant t(i), t(i+1) of its maximum is determined, that is the time instant of the maximum discrete digital signal.

The lowest time acceptance window τ possible will be selected, so as to restrict the fortuitous coincidences of two simultaneous interactions at neighbouring pixels. It can be a few microseconds or even less.

The second digital processing means 2.4 check whether the relationship below is fulfilled:

$$|t(i)-t(i+1)|<\tau \quad (3)$$

If this relationship is fulfilled, it is considered that there are two preserved digitized pulses coming from two neighbouring reading electrodes and likely to reveal charge share.

The second digital processing means 2.4 further include means 205 for rejecting one of both digitized pulses as revealing a charge share and for preserving the other. This rejecting means 205 cooperate with the means 205 for determining two preserved digitized pulses coming from two neighbouring reading electrodes.

In the example described, the digitized pulse which is preserved is the one the maximum amplitude of which is the greatest. The other is rejected. It will be noted that the opposite would have been possible.

The second digital processing means 2.4 therefore apply the relationship (4) to select the digitized pulse to be preserved and to reject the other digitized pulse during the charge share processing:

$$\text{Max}(i)>\text{Max}(i+1) \quad (4)$$

If this relationship (4) is fulfilled, the preserved digitized pulse S(i) is the one coming from the reading electrode i. The rejected digitized pulse S(i+1) is therefore the one coming from the reading electrode i+1.

The second digital processing means 2.4 further include means 206 for correcting the digitized pulse S(i) selected with the rejected digitized pulse S(i+1). More precisely, the means 206 for correcting the digitized pulse selected add to the maximum amplitude of the selected digitized pulse the maximum amplitude of the rejected digitized pulse.

The following relationship is thus applied:

$$\text{Max}(i)\text{corrected}=\text{Max}(i)+\text{Max}(i+1).$$

If the relationship (4) is not fulfilled, it means that the selected digitized pulse is the one coming from the reading electrode i+1. The rejected digitized pulse therefore is the one coming from the reading electrode i.

In this case, the selected digitized pulse is corrected with the rejected digitized pulse in the following way:

$$\text{Max}(i+1)\text{corrected}=\text{Max}(i+1)+\text{Max}(i).$$

This corrected digitized pulse is a useful signal which will be operated and which is transmitted to the operating circuit 2.5 by the reading circuit 2.

In FIG. 5, the third block 62 corresponds to the shared charge removal steps.

During the steps, after the optional electronic noise removal, only the induction share and not the charge share can be corrected. Alternatively, it is possible to correct the induction share and charge share as illustrated in FIG. 5. Regarding the processing order, there is no obligation. One can start with the processing regarding induced charges, and then go on with the processing regarding shared charges as illustrated in FIG. 5. The opposite is also possible given that both corrections are implemented.

Figure 3B:
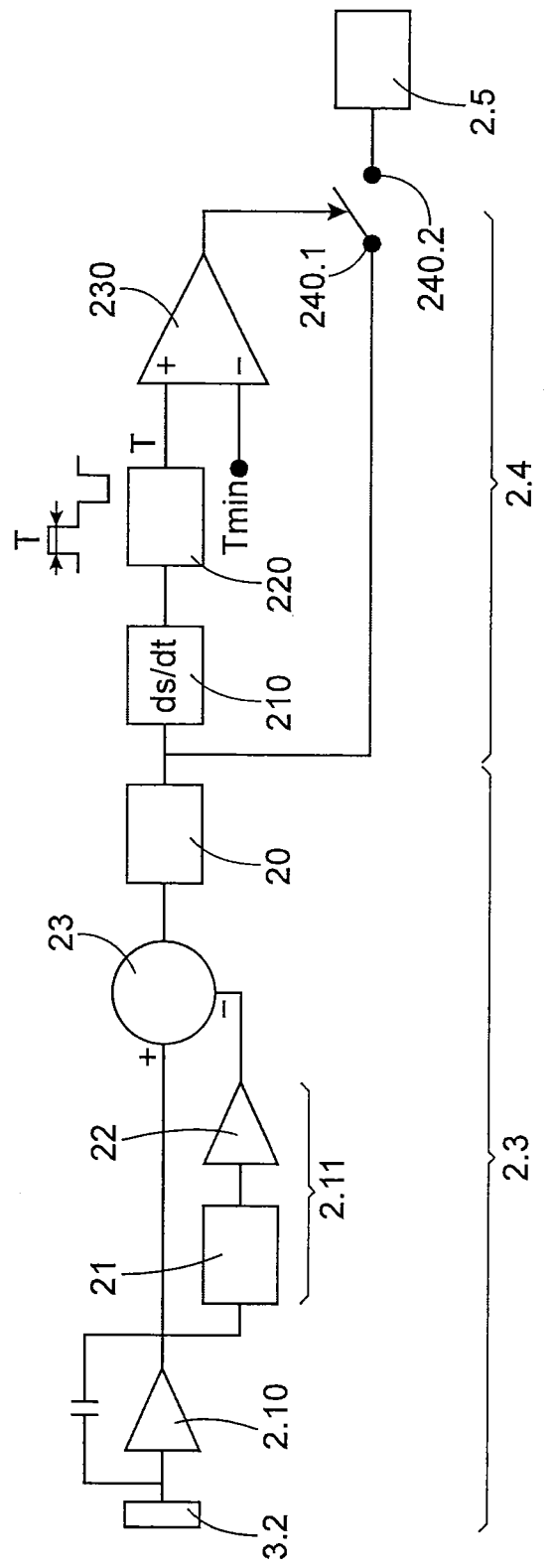

In FIG. 3B, an alternative of an ionizing radiation detection device object of the invention has been represented, in which the first processing means 2.3 are analogue and wherein the second processing means 2.4 are also analogue and are capable of correcting the induction share. The first processing means have no digital processing means.

The first processing means 2.3 include as above a charge preamplifier 2.10 followed by a shaping means 2.11. As already set out above, there could have been only the charge preamplifier.

Optionally, in the first processing means 2.3 just upstream of the second processing means 2.4, amplitude discriminating means 20 can be provided as described previously.

The second processing means 2.4 connected at the output of the first processing means 2.3 include a cascade with a derivating filter 210 allowing the output of a signal which is a derivative of the analogue pulse delivered by the first processing means 2.3, a time-amplitude converter 220 delivering a signal depending on the duration T during which the signal delivered by the derivating filter 210 is positive. The signal delivered by the time-amplitude converter 220 is applied at the input of a comparator 230, herein in this example on the non-inverting input of the comparator 230. This signal delivered by the time-amplitude comparator 220 will be compared to a predetermined set point time Tmin. This set point time is applied on the other input, herein in the inverting input of the comparator 230.

The second processing means 2.4 further include a switch 240 a first terminal 240.1 of which is connected at the input of the second processing means 2.4, that is at the output of the first processing means 2.3 and a second terminal 240.2 of which is connected to the operating means 2.5. This switch 240 is controlled by a signal delivered by the comparator 230. The control is made such that the switch 240 is closed when the signal delivered by the time-amplitude converter 220 has a duration T higher than the set point time Tmin. Thus, the analogue pulse delivered by the first processing means 2.3 is preserved and it will be transmitted to the operating means 2.5.

In the opposite, when the signal delivered by the time-amplitude converter 220 has a duration T lower than the set point time Tmin, the control is such that the switch 240 is open and the analogue pulse delivered by the first processing means 2.3 is rejected.

Thus, the means for determining a parameter are based on a time parameter which corresponds to the time elapsed between the start of the analogue pulse and a first zero crossing of the analogue pulse. This time is the one during which the analogue pulse has a positive amplitude.

Alternatively, the second analogue processing means could enable the rise time of the analogue pulse or the minimum of the analogue pulse after a zero crossing of the analogue pulse to be determined. The implementation of such second analogue processing means is within reach of those skilled in the art.

Figure 6A:
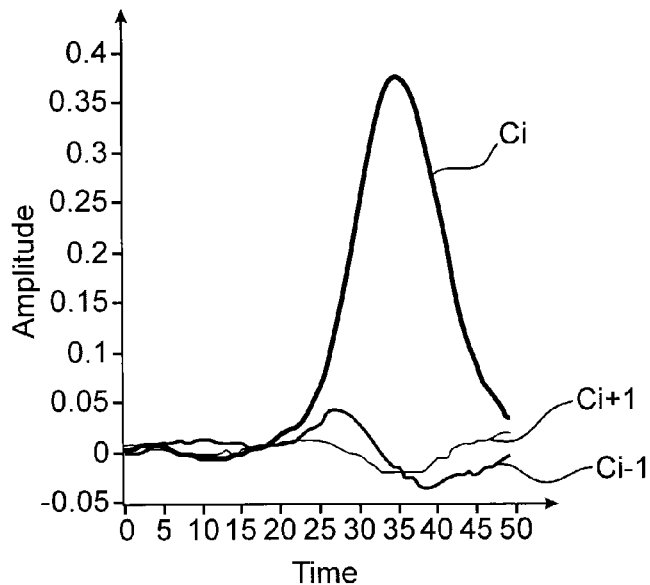
FIGS. 6A, 6B and 6C show exemplary analogue pulses digitized by a digital oscilloscope and provided by three neighbouring reading electrodes corresponding to different interaction situations between a ionizing radiation emitted by a cobalt 57 ionizing radiation source and a cadmium telluride semi-conductor detector.
Figure 6B:
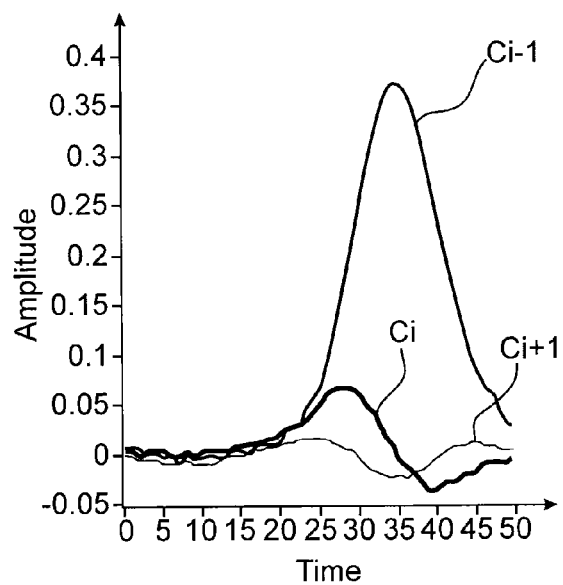
Figure 6C:
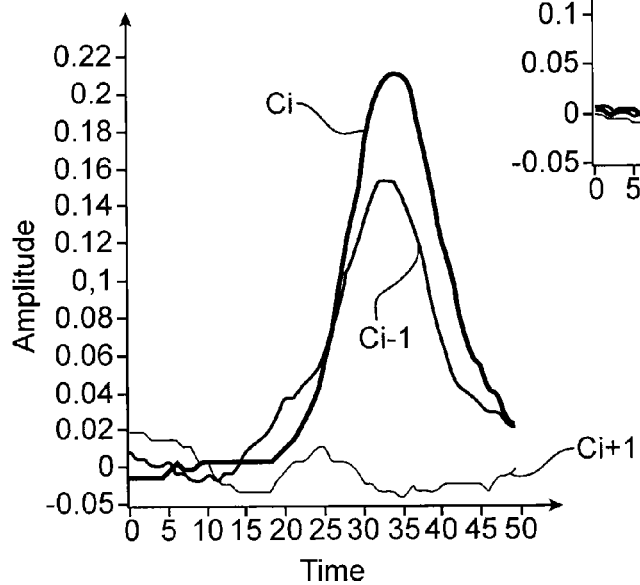

Exemplary analogue pulses digitized by digital oscilloscope and coming from three neighbouring reading electrodes called i−1, i and i+1 will now be considered referring to FIGS. 6A, 6B and 6C.

The detector is cadmium telluride CdTe detector. The reading circuit 2 is in accordance with that illustrated in FIG. 3A. The ionizing radiation source is a cobalt 57 gamma radiation source. It emits gamma photons the energy of which is about 122 keV.

Pulses represented in FIGS. 6A, 6B, 6C are delivered by a digital oscilloscope connected at the output of the analogue processing means 2.1, upstream of the digital processing means 2.2, that is upstream of the digitizer means 2.20. The place where digital oscilloscope would be connected is represented by arrows, in FIG. 3A. Unlike analogue models, in a digital oscilloscope, the signal to be viewed is digitized beforehand by an integrated analogue-digital converter.

In these FIGS. 6A to 6C, curves Ci−1, Ci and Ci+1 respectively represent analogue pulses digitized by the digital oscilloscope and coming respectively from the electrodes i−1, i, i+1.

In FIG. 6A, curve Ci is the consequence of a gamma photon that interacted with the semi-conductor material associated with the reading electrode i. Curves Ci−1, Ci+1 illustrate that a low signal is induced on the neighbouring pixels associated with the electrodes i+1 and i+1.

In FIG. 6B, curve Ci−1 is the consequence of the interaction of a gamma photon with the semi-conductor material associated with the reading electrode i−1. Curve Ci has a significant amplitude, it corresponds to an induction share. It will however be noted that with the device according to the invention illustrated in FIG. 3A, if the minimal threshold $S\_min_i$ is set to too low a value, for example equal to 0.05V, the digitized pulse coming from the electrode i will be taken into account and considered as a useful signal. The selection of the minimum threshold $S\_min_i$ is to be made carefully.

Figure 7A:
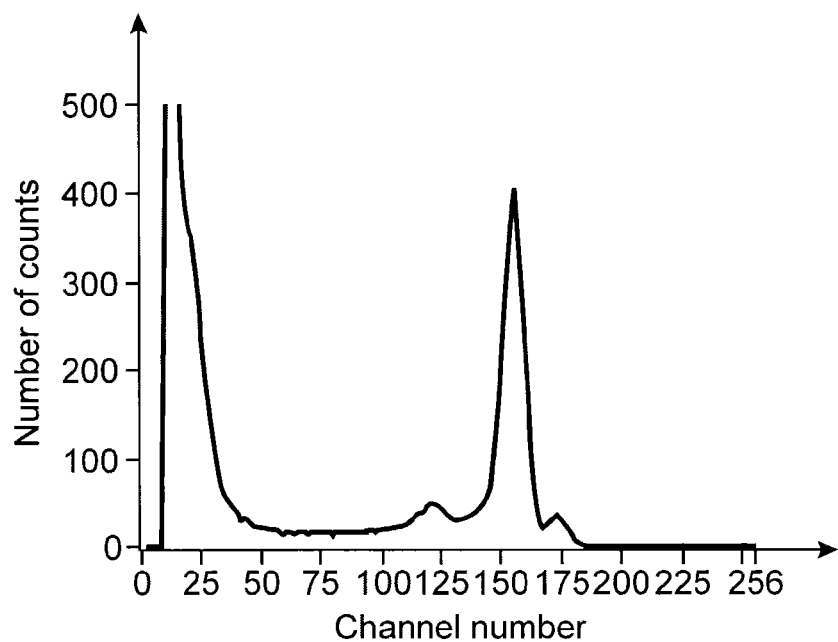
FIG. 7A is the spectrum obtained with the same source-detector assembly as in FIGS. 6A-6C without induction share processing.
Figure 7B:
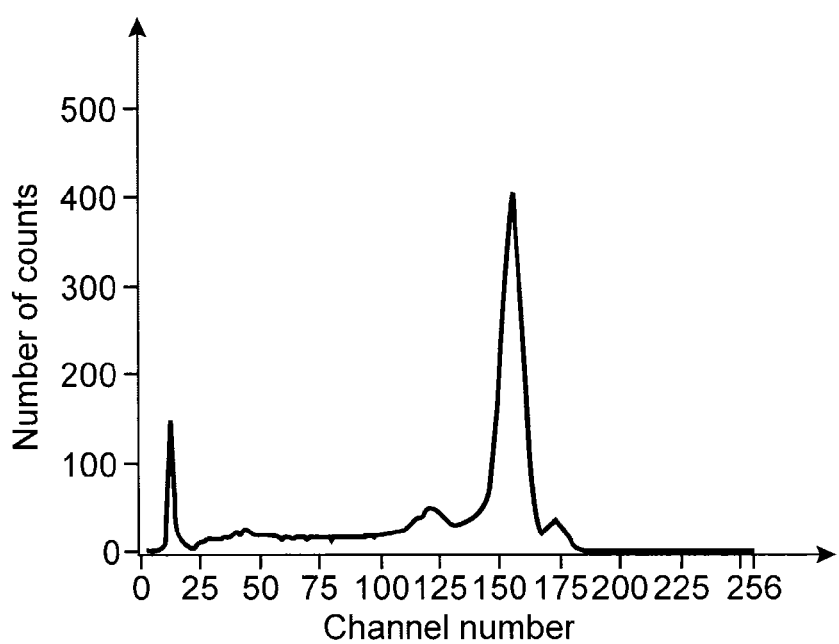
FIG. 7B is the spectrum obtained with the same source-detector assembly with induction share processing.

FIGS. 7A and 7B show the energy spectrum provided by the reading circuit of an ionizing radiation detection device produced by a cobalt 57 gamma radiation source, this ionizing radiation detection device being provided with a cadmium telluride detector. Conventionally, this spectrum illustrates the number of counts for each channel, a channel corresponding to a division of the pulse amplitude scale, for example a few hundred eVs. The number of counts is the number of pulses classified in each channel.

In FIG. 7A, the spectrum represented has been provided by a reading circuit in accordance with prior art and there has been no induction share removal, the induction share corresponding to the contribution of induced signals. Pulses corresponding to induction share have a low energy amplitude and are visible for low energy channels, the number of which is lower than about 50.

In FIG. 7B, the spectrum represented has been provided by a reading circuit in accordance with the invention having a function of processing, that is correcting, of the induction share.

Clearly, pulses which do not fulfil one of the induction share criteria set out above have not been taken into account in the spectrum. The number of counts in the low energy channels has strongly decreased with respect to the representation of FIG. 7A.

FIG. 7C illustrates a case of share charge. The sum of the maximum amplitude of curve Ci and the maximum amplitude of curve Ci−1 substantially corresponds to the maximum amplitude of curve Ci of FIG. 7A.

Without correcting the charge share phenomenon, from the two pulses coming from the reading electrodes i and i−1, a count would be counted for each of pulses, but in a channel having an energy lower than that corresponding to the energy of the interaction. An error would then have been made regarding the number of counts but also regarding the estimation of the interaction energy.

By correcting one of both pulses as the reading circuit permits it and by only taking into account the corrected pulse, it is possible to correct both the double counting and the estimation on energy.

On the other hand, if the mere charge share correction is sufficient, without performing a rejection due to induction share, the risk is to sum the amplitude of a pulse related to induction share with the amplitude of a pulse related to charge share. That is why it is more advantageous for the second processing means to first dispense with induction share before performing the correction related to charge share.

Figure 8:
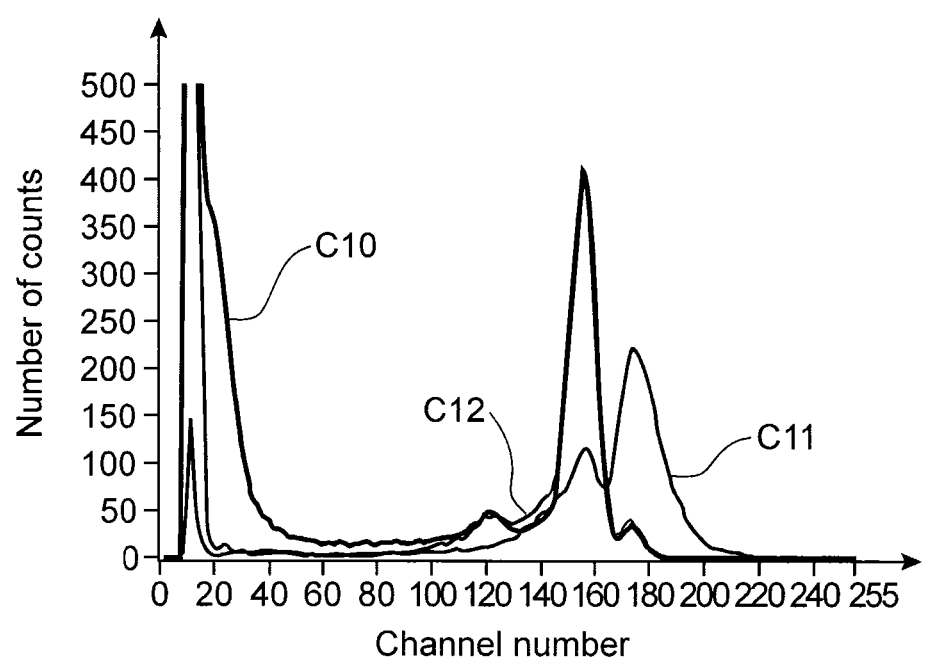
FIG. 8 illustrates the spectrum obtained with the same source-detector assembly as in FIGS. 6A-6C with only the processing of electronic noise, the spectrum obtained with the processing of electronic noise and charge share, the spectrum obtained with the processing of electronic noise, charge share and induction share.

In FIG. 8 are represented spectra still obtained with a same cadmium telluride semi-conductor detector and a same cobalt 57 gamma radiation source. The spectrum referenced C10 comes from digitized pulses that underwent no correction processing for induction share or charge share. The spectrum referenced C11 comes from digitized pulses that underwent the processing of charge share described above and the electronic noise removal processing. The spectrum referenced C12 comes from digitized pulses that underwent, in addition to the electronic noise removal processing, first the processing of induction share and then the processing of charge share.

It is observed that the number of counts in the low energy channels, numbers of channels lower than about 40, have strongly decreased on spectrum C11 with respect to spectrum C10, since digitized pulses affected by charge share have been rejected. Furthermore, the peak of the spectrum C11 has been distorted and widened, since a maximum of a digitized pulse selected has been added, coming from a reading electrode, to the maximum of a digitized pulse rejected coming from a neighbouring reading electrode, these two digitized pulses having been detected as likely to reveal a charge share. This distortion and widening could reflect a degradation in energy resolution.

Spectrum C12 is such that its peak corresponds to digitized pulses coming from neighbouring electrodes for which a maximum has been summed, neither of both digitized pulses which have been summed has undergone a processing of induction share.

Still referring to spectrum C12, it can be said that the number of counts with a low amplitude has been reduced, in channels the number of which is lower than about 40, with respect to spectrum C11 or C10, since induction share has been dispensed with.

The number of counts in intermediate channels has also been reduced, the number of which is between about 40 and 120, with respect to spectrum C10 since charge share has been dispensed with.

The number of counts has slightly increased in the peak of spectrum C12, for channels the number of which is between about 120 and 170 without degrading too much the energy resolution since the processing of charge share has been performed after the processing of induction share.

The processing performed on pulses to dispense induction share and possibly charge share is only possible because said pulses have been continuously digitized at the output of the first processing means.

Starting with the processing of induction share before performing the processing of charge share enables the energy detection threshold to be reduced. By energy detection threshold, it is meant the minimum detectable energy. Indeed, the signal obtained in low energy channels is not, or is less, saturated with signals corresponding to induced signals. It rather represents interactions that release a low energy.

Furthermore, not using a digitized pulse affected by induction share to correct a preserved digitized pulse during the processing of charge share enables a more reliable correction of charge share to be obtained. In other words, the combination comprising a correction of induced signals followed by a correction of charge share is particularly advantageous.

By reducing the extent of the time acceptance window, the probability of fortuitous coincidences is efficiently reduced, that is distinct interactions that can be considered as a charge share.

Thanks to the correction of charge share, the probability of fortuitous coincidences of two simultaneous interactions at two neighbouring pixels is reduced.

Although some embodiment of the present invention has been represented and described in detail, it will be understood that different changes and alterations can be provided without departing from the scope of the present invention, in particular other parameters or criteria could be employed.

The invention claimed is:

1. An ionizing radiation detection device comprising:
   a detector of semi-conductor material to be biased with electrodes, including reading electrodes capable of collecting charges created in the detector during an interaction between the ionizing radiation and the semi-conductor material of the detector and which are connected to a reading circuit;
   first processing means for providing a pulse when a charge has been collected by one of the reading electrodes, the pulse being formed with respect to a baseline,
   second means for processing the pulse provided by the first processing means including:
      means for determining a parameter comprising a time parameter of the pulse or an amplitude value of the pulse after a baseline crossing between the start and the end of the pulse,
      means for rejecting the whole pulse depending on the value of said parameter and for preserving the pulse if it is not rejected, and
   means for operating the pulse preserved by the rejecting means.

2. The detection device according to claim 1, wherein the parameter is a time parameter selected from the rise time of the pulse, the time elapsed between the start of the pulse and the first baseline crossing of the pulse.

3. The detection device according to claim 1, wherein the amplitude value of the pulse after a baseline crossing between the start and the end of the pulse is the minimum of the pulse.

4. The detection device according to claim 1, wherein, when the pulse is analogue, the time parameter corresponds to the duration during which the analogue pulse has a positive amplitude.

5. The detection device according to claim 1, wherein the first processing means include analogue processing means including a charge preamplifier connected to a shaping circuit, said analogue processing means being capable of providing an analogue pulse the amplitude of which is proportional to the charge collected by one of the reading electrodes.

6. The detection device according to claim 1, wherein the first processing means include digital processing means capable of providing a digitized pulse when a charge has been collected by one of the reading electrodes, said digitized pulse being formed by a succession of discrete signals, said digital processing means being downstream of the analogue processing means insofar as the analogue processing means are present.

7. The detection device according to claim 6, wherein the digital processing means include a digitizer and downstream of said digitizer, digital shaping means.

8. The detection device according to claim 1, wherein the second processing means are digital.

9. The detection device according to claim 8, wherein the second processing means further include means for determining a time deviation between two digitized pulses provided by the first processing means and coming from two neighbouring electrodes,
   means for rejecting one of the digitized pulses and for preserving the other digitized pulse depending on this time deviation.

10. The detection device according to claim 9, wherein the time deviation is the deviation between the maximum of one of the pulses and the maximum of the other of the pulses, this deviation having to be included in an acceptance window predetermined for the rejecting means to reject one of the digitized pulses and to preserve the other.

11. The detection device according to claim 9, wherein the rejecting means reject the digitized pulse the maximum amplitude of which is the smallest and preserve the digitized pulse the maximum amplitude of which is the greatest.

12. The detection device according to claim 9, wherein the second processing means further include means for correcting the preserved digitized pulse together with the rejected digitized pulse.

13. The detection device according to claim 12, wherein the means for correcting the preserved digitized pulse add to the maximum amplitude of the preserved digitized pulse the maximum amplitude of the rejected digitized pulse.

14. The detection device according to claim 1, wherein the second processing means or the first processing means further include amplitude discriminating means capable of rejecting any pulse that said processing means have to process having a maximum amplitude lower than a predetermined threshold.

15. An ionizing radiation detection method by a detector of semi-conductor material for being biased thanks to electrodes including reading electrodes capable of collecting charges created in the detector during an interaction between the ionizing radiation and the semi-conductor material of the detector and which are connected to a reading circuit, wherein the method includes the steps of:
   providing, after processing by first processing means, a pulse when a charge has been collected by one of the reading electrodes, the pulse being formed with respect to a baseline;
   processing by second processing means of the pulse provided by the first processing means, said processing comprising:
      determining by determining means a parameter comprising a time parameter of the pulse or an amplitude value of the pulse after baseline crossing between the start and the end of the pulse,
      rejecting, by rejecting means, the whole pulse depending on the value of said parameter and preserving the pulse if it is not rejected
      operating the preserved pulse by the rejecting means.

16. The method according to claim 15, wherein the providing step by the first processing means provides an analogue or digitized pulse.

17. The method according to claim 15, wherein the processing by the second processing means includes determining a time deviation between two digitized pulses provided by the first processing means and coming from two neighbouring electrodes, rejecting one of the digitized pulses and preserving the other digitized pulse depending on this time deviation.

18. The method according to claim 17, wherein the processing by the second processing means further includes correcting the preserved digitized pulse together with the rejected digitized pulse.

19. The method according to claim 15, further including an amplitude discriminating step for rejecting any pulse to be processed by the first processing means or the second processing means having a maximum amplitude lower than a predetermined threshold.

20. An ionizing radiation detection device comprising:
a detector of semi-conductor material to be biased with electrodes, including reading electrodes capable of collecting charges created in the detector during an interaction between the ionizing radiation and the semi-conductor material of the detector and which are connected to a reading circuit; and
circuitry configured to:
provide a pulse when a charge has been collected by one of the reading electrodes, the pulse being formed with respect to a baseline,
determine a parameter comprising a time parameter of the pulse or an amplitude value of the pulse after a baseline crossing between the start and the end of the pulse,
reject the whole pulse depending on the value of said parameter and preserve the pulse if it is not rejected, and
operate the pulse when the pulse is preserved.

* * * * *

UNITED STATES PATENT AND TRADEMARK OFFICE
CERTIFICATE OF CORRECTION

PATENT NO. : 8,748,832 B2  
APPLICATION NO. : 13/535852  
DATED : June 10, 2014  
INVENTOR(S) : Andrea Brambilla et al.

Page 1 of 1

It is certified that error appears in the above-identified patent and that said Letters Patent is hereby corrected as shown below:

On the title page, Item (54) and in the Specification, Column 1, the title is incorrect. Item (54) and Column 1 should read:

**IONIZING RADIATION DETECTION DEVICE WITH
A SEMI-CONDUCTOR DETECTOR HAVING AN IMPROVED
SPECTROMETRIC RESPONSE**

Signed and Sealed this
Sixteenth Day of September, 2014

Michelle K. Lee
*Deputy Director of the United States Patent and Trademark Office*